(12) United States Patent
Nagarajan et al.

(10) Patent No.: US 9,093,093 B2
(45) Date of Patent: Jul. 28, 2015

(54) ADAPTIVE GUARD BAND FOR MULTIPLE HEADS OF A DATA STORAGE DEVICE

(71) Applicant: Seagate Technology LLC, Cupertino, CA (US)

(72) Inventors: Subra Nagarajan, Prior Lake, MN (US); Joshua W. Christensen, Savage, MN (US); Wei W. Zhao, Shakopee, MN (US); Daniel D. Dittmer, Shakopee, MN (US); Richard Garner Cox, Bloomington, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/063,501

(22) Filed: Oct. 25, 2013

(65) Prior Publication Data

US 2015/0116863 A1    Apr. 30, 2015

(51) Int. Cl.
G11B 21/02    (2006.01)
G11B 5/09    (2006.01)
G11B 5/55    (2006.01)
G11B 5/54    (2006.01)
G06F 3/06    (2006.01)

(52) U.S. Cl.
CPC ............... *G11B 5/5526* (2013.01); *G11B 5/54* (2013.01); *G11B 5/5521* (2013.01); *G06F 3/0601* (2013.01)

(58) Field of Classification Search
None
See application file for complete search history.

(56) References Cited

U.S. PATENT DOCUMENTS

| | | | | |
|---|---|---|---|---|
| 5,940,242 | A | * | 8/1999 | Lee .......................... 360/78.08 |
| 5,969,895 | A | * | 10/1999 | Ueda et al. ...................... 360/61 |
| 6,937,419 | B2 | | 8/2005 | Suk et al. |
| 6,980,386 | B2 | * | 12/2005 | Wach et al. ..................... 360/63 |
| 7,164,549 | B2 | | 1/2007 | Flechsig et al. |
| 7,298,575 | B2 | * | 11/2007 | Flechsig et al. ................. 360/75 |
| 7,542,223 | B2 | | 6/2009 | Hashimoto et al. |
| 8,179,627 | B2 | | 5/2012 | Chang et al. |

\* cited by examiner

*Primary Examiner* — Andrew L Sniezek
(74) *Attorney, Agent, or Firm* — Westman, Champlin & Koehler, P.A.

(57) ABSTRACT

An adaptive guard band scheme is disclosed for a data storage device. In illustrated embodiments, the adaptive guard band scheme formats different guard band cylinders and track zeros for different heads depending upon a contact cylinder of the different heads. In an illustrative embodiment, the adaptive guard band scheme utilizes the contact cylinders for the heads and a no fly cylinder to determine track zero(s) and extended data zone(s) for select heads.

19 Claims, 18 Drawing Sheets

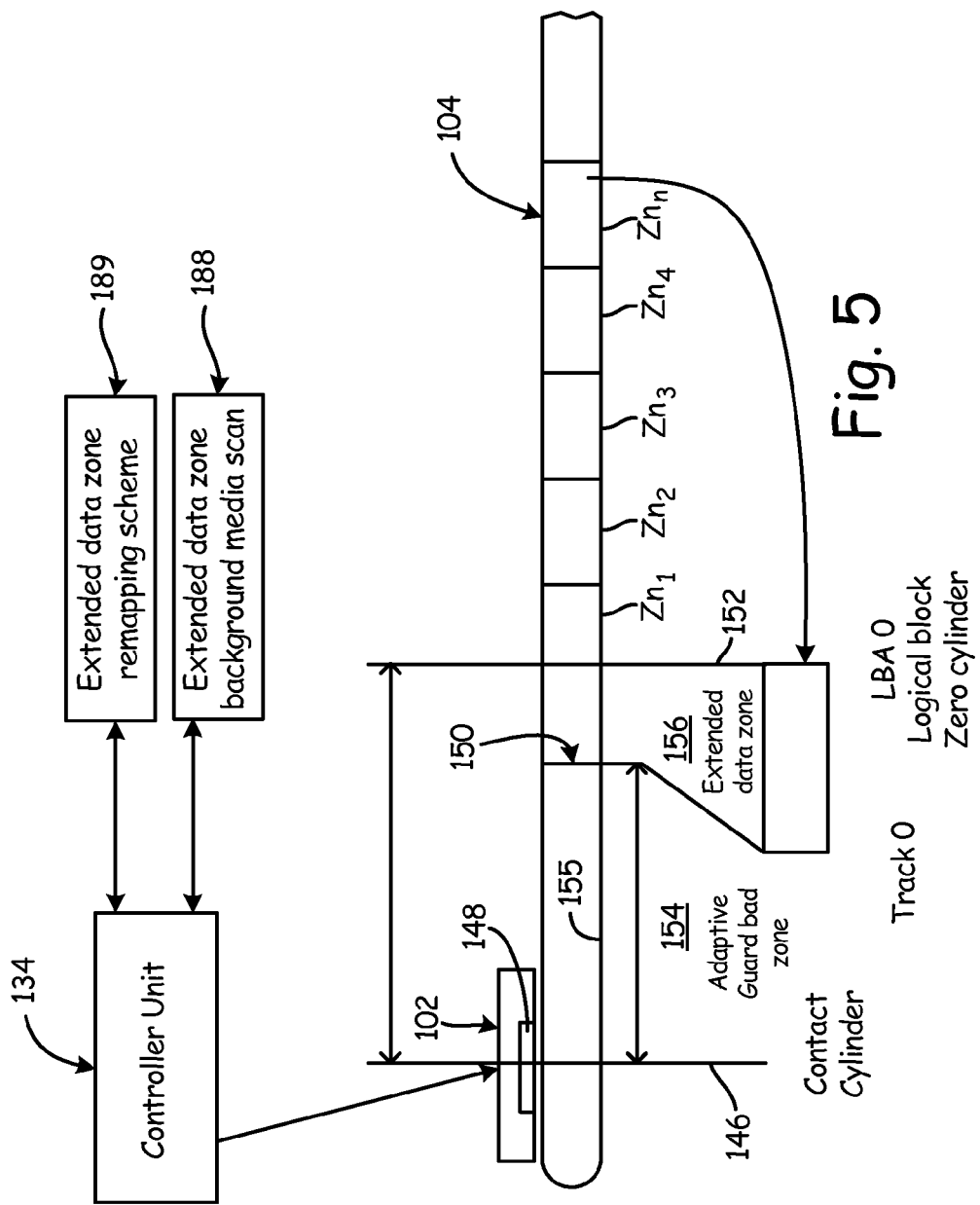

ADAPTIVE GUARD BAND FOR MULTIPLE HEADS OF A DATA STORAGE DEVICE

CROSS-REFERENCE TO RELATED APPLICATION

This application cross-references and claims the benefit of U.S. application Ser. No. 14/063,509, now pending on even date herewith entitled "ADAPTIVE GUARD BAND FOR IMPROVED DATA STORAGE CAPACITY".

SUMMARY

The present application relates to an adaptive guard band scheme to increase data storage capacity for a data storage device. In illustrated embodiments, different track zeros are formatted for different heads depending upon a contact cylinder of the different heads to increase data storage capacity. In an illustrative embodiment, an adaptive guard band algorithm utilizes the contact cylinders for the heads and a no fly cylinder to determine the adaptive guard band cylinder and track zero for different heads. In embodiments disclosed, the algorithm configures track zero for different heads based upon an optimum data storage capacity determination utilizing available tracks for the different heads. Other features and benefits that characterize embodiments of the present invention will be apparent upon reading the following detailed description and review of the associated drawings.

BRIEF DESCRIPTION OF THE DRAWINGS

FIG. 5 illustrates an implementation of an adaptive guard scheme and extended data zone for increased data storage capacity.

DETAILED DESCRIPTION OF ILLUSTRATIVE EMBODIMENTS

Data storage devices use heads including one or more transducer elements, to write data to a recording media or disc and read data from the recording media or disc. For ramp load/unload devices or contact start/stop devices, the heads are supported on ramps or landing zones at an outer or inner diameter of the disc during non-operational periods. The heads are supported on the ramp or landing zone to limit damage to the media. During a power-on sequence, the heads are moved off the ramp or landing zone to a load/unload area at the outer diameter of the disc where an air bearing surface of the head is pressurized for read/write operations. The load/unload area of the media is more susceptible to damage because of the higher risk of contact between the head and the media as the head is unloaded from the ramp and pressurized or as the head is loaded onto the ramp as the device is powered down. Damage to the media in the load/unload area can result in loss of data if data is stored in the load/unload area. The foregoing is intended to provide an illustrative use of embodiments of the adaptive guard band disclosed in the present application, but is not exhaustive of the use and application of the embodiment disclosed in the present application. Embodiments of the present invention provide solutions to these and other problems, and offer other advantages over the prior art.

Figure 1:
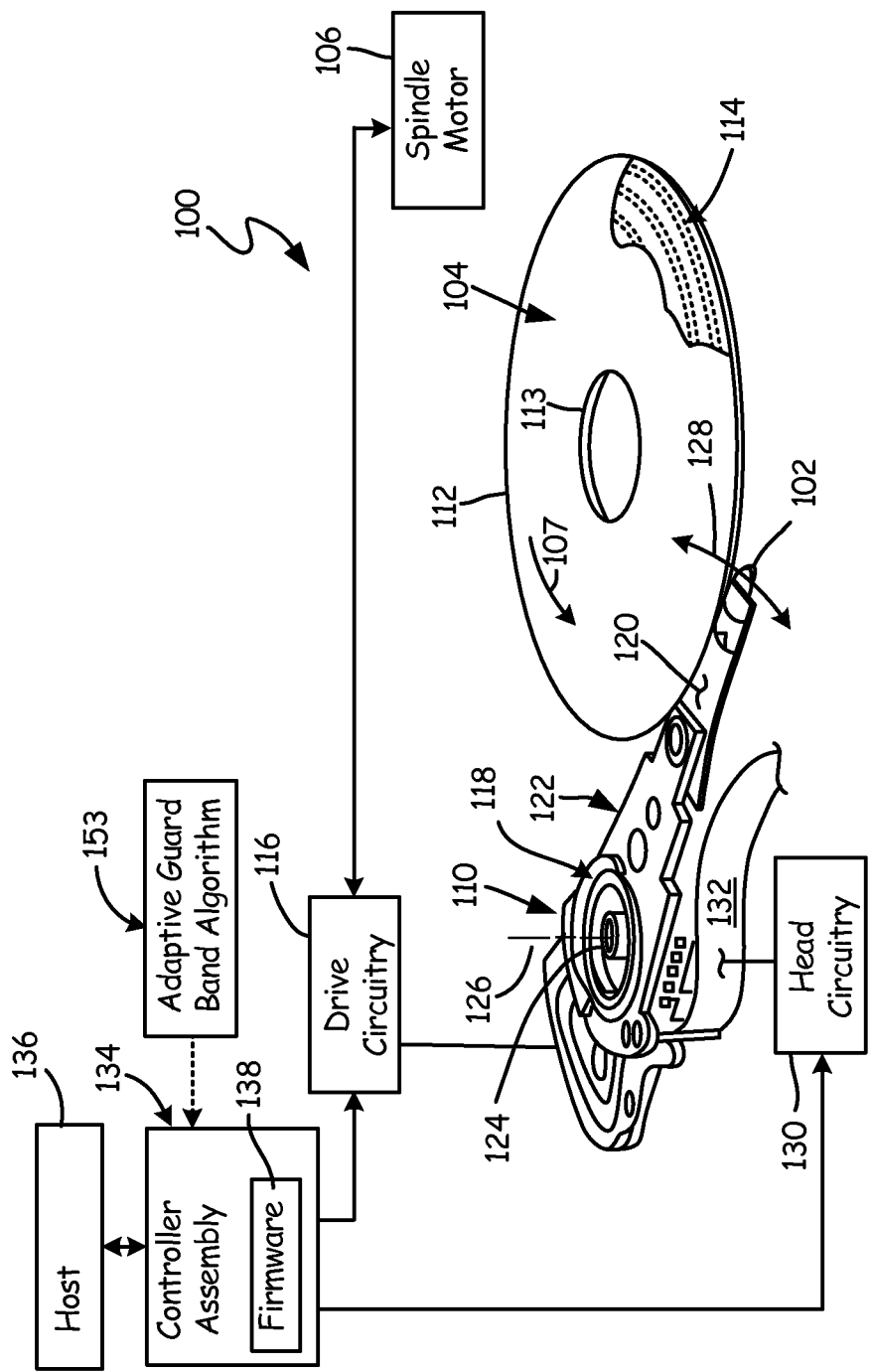
FIG. 1 is a schematic illustration of a data storage device configured to implement an adaptive guard band algorithm or scheme for extended data storage capacity.

The present application describes adaptive guard band schemes for providing extended data storage for data storage devices 100 for example, the data storage device 100 illustrated in FIG. 1. As shown in FIG. 1, the data storage device 100 includes a head 102 and a magnetic recording media 104. The head 102 including one or more transducer elements (not shown in FIG. 1) is positioned above the recording media 104 to read data from and/or write data to the recording media 104. In the embodiment shown, the recording media 104 is a rotating disc or other magnetic storage media that includes a magnetic storage layer or layers. For read and write operations, a spindle motor 106 (illustrated schematically) rotates the media 104 as illustrated by arrow 107 and an actuator mechanism 110 moves the head 102 between an outer diameter or cylinder 112 and an inner diameter or cylinder 113 of the disc 104 to position the head 102 relative to data tracks 114 on the rotating media 104.

Both the spindle motor 106 and actuator mechanism 110 are connected to and operated through drive circuitry 116 (schematically shown). The head 102 is coupled to an actuator block 118 of the actuator mechanism 110 through a suspension assembly which includes a load beam 120 connected to an actuator arm 122 of the actuator block 118 for example through a swage connection. The actuator block 118 is rotationally coupled to a frame or deck (not shown) through a bearing 124 to rotate about axis 126. Rotation of the actuator mechanism 110 or block 118 moves the head 102 in a cross track direction as illustrated by arrow 128. The one or more transducer elements of the head 102 are coupled to head circuitry 130 through flex circuit 132 to encode and/or decode data as the disc rotates. Drive circuitry 116 and head circuitry 130 are controlled through a controller assembly 134. The controller assembly 134 includes one or more hardware and software components to implement read and write functions of the device and interface with a host system 136 as schematically shown. The hardware includes memory and one or more processor devices to store and implement algorithms or instructions of the device. Although FIG. 1 illustrates a single load beam 120 coupled to the actuator block 118, additional load beams 120 and heads 102 can be coupled to the actuator block 118 to read data from or write data to multiple discs of a disc stack as described herein.

As schematically shown in FIG. 1, a recording surface of the media 104 includes a plurality of data tracks 114 spaced between the outer diameter 112 and inner diameter 113 of the disc. The tracks 114 contain embedded servo data or sectors to locate and position the head 102 relative to cylinders of the disc. Typically, the servo sectors include a track address, a sector or segment address and servo data for track following. The servo data is encoded on the disc at the time of manufacture via a dedicated servo track writer or using self-servo track writing algorithms that use the data heads 102 of the data storage device to encode the servo data on the disc 104. Track density or tracks per inch (TPI) for a particular disc depends on the read/write head width, off-track performance or bit error rate (BER) and other characteristics of the device. Prior to formatting the device, various measurements are used to determine optimum TPI or bits per inches (BPI) to format the media or disc.

Figure 2A:
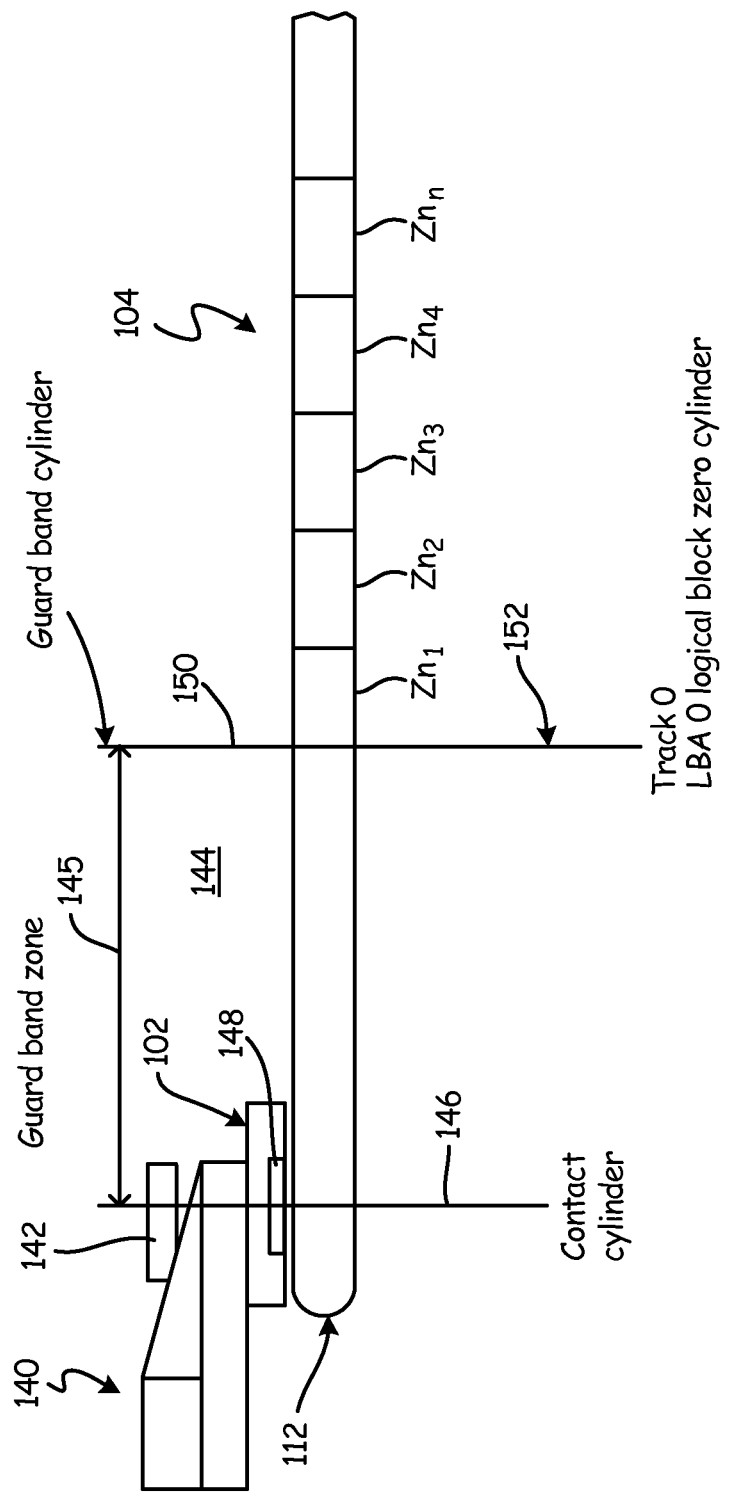
FIG. 2A illustrates an embodiment of a recording media including a guard band having a guard band cylinder at a logical block zero cylinder of the recording media.

Data on a disc is typically addressed using a logical block address (LBA) which corresponds to a physical location on the disc. The LBA addresses are assigned to physical data blocks or sectors on the disc 104 in numerical sequence beginning at a logical block zero cylinder. The LBA address, logical block zero cylinder and format data is stored in firmware or memory 138 of the controller assembly 134 to provide a physical zone and cylinder location for logical blocks of data stored on one or more discs 104 of the device. The controller assembly 134 includes algorithms and/or tables to convert the LBA to a physical block, or cylinder location on the disc. As shown in FIG. 2A, the disc is divided into zones $z_1$-$z_n$, including groups of adjacent tracks having a similar number of data blocks or sectors for zone bit recording. Zone $z_1$ proximate to the outer diameter 112 of the disc includes more data blocks or sectors about the circumference of the disc compared to zone $z_n$ proximate to the inner diameter 113 of the disc. The increased number of data blocks or sectors at the outer diameter 112 provides a higher bit recording rate at the outer diameter 112 than at the inner diameter 113 of the disc 104.

As shown in FIG. 2A for ramp load/unload, the head 102 is supported on a ramp 140 at the outer diameter 112 of the disc. The head 102 is supported on the ramp 140 off the media during idle or non-operational periods to limit damage to the media as a result of head contact with the media. For operation, the heads 102 are unloaded from the ramp 140 and are positioned via operation of the actuator mechanism 110 to read and write data to tracks 114 on the data storage media 104. During non-operational periods, the head 102 engages the ramp 140 through a load tab 142 (illustrated schematically) coupled to the head 102 through the suspension assembly. For operation, the actuator mechanism 110 rotates the head 102 away from the ramp 140 to a load/upload area of the media or discs 104 to pressurize the air bearing surface of the head 102 to provide a fly height for the head 102 for read/write operations. The fly height of the head 102 is unstable in load/unload area and data stored in the load/unload area is more susceptible to corruption or damage.

Typically, devices include a guard band zone 144, which is designated as a no data storage zone in the load/unload area to reduce data loss or damage in the load/unload area proximate to the ramp 140. In the embodiment shown in FIG. 2A, the guard band zone 144 has pad width 145 that is measured from a contact cylinder 146 where the head 102 contacts the ramp 140 to a guard band cylinder spaced from the contact cylinder 146. Contact is detected using a read-back signal from a read element 148 on the head and the contact cylinder 146 corresponds to the track of the read element 148 of the head at which contact is detected. Formatting algorithms implemented through the controller assembly 134 use contact data to format track zero 150, the guard band zone 144 and data zones $z_1$-$z_n$ for the disc. Track zero 150 is a first data track of the recording media or disc accessed by the host 136 to read and write data. In the illustration shown in FIG. 2A, the disc is formatted so that track zero 150 and a logical block zero cylinder 152 for device is at a guard band cylinder spaced the pad width 145 from the contact cylinder 146. In the embodiment shown in FIG. 2A, the LBA addresses for data are assigned to physical tracks or cylinders on the disc in sequence beginning at the logical block zero cylinder 152 at track zero 150.

Figure 2B:
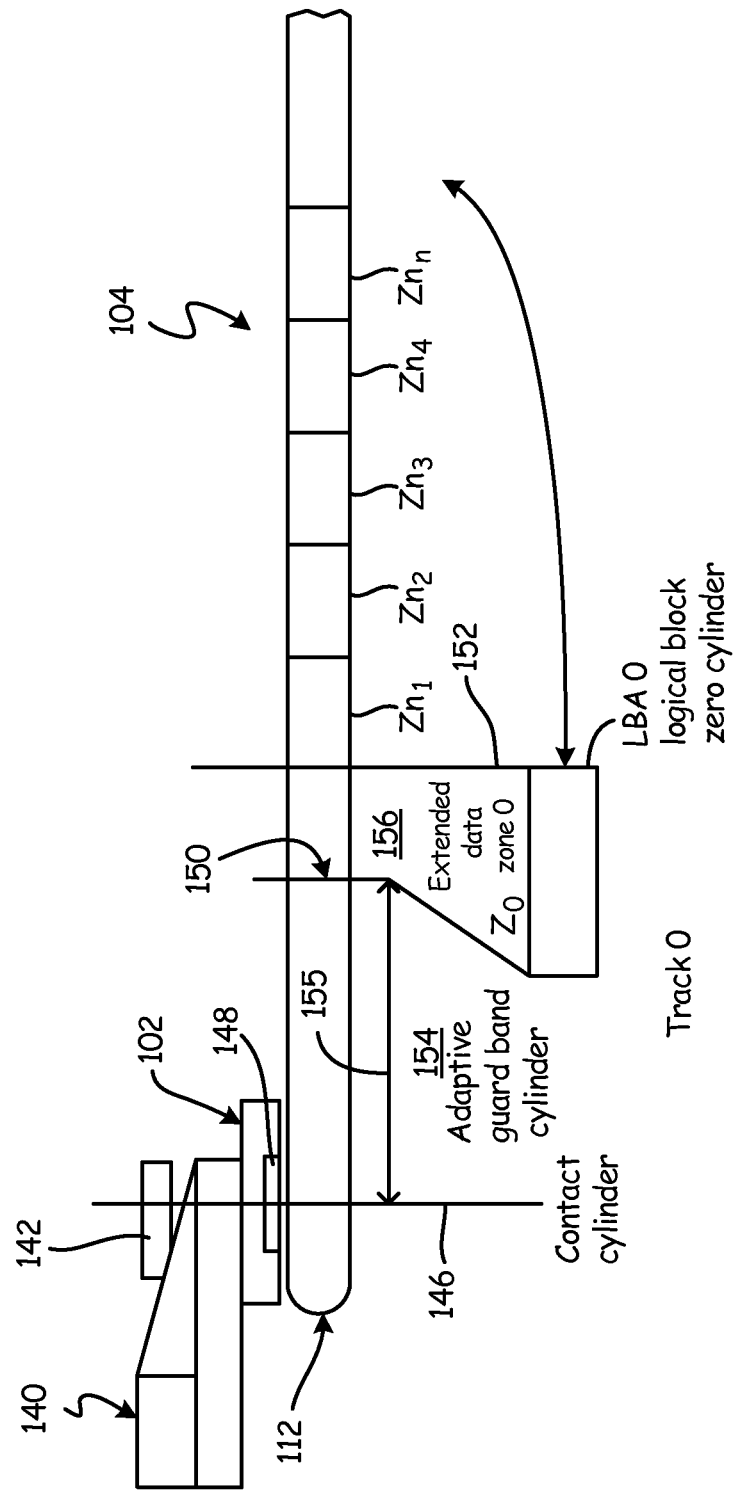
FIG. 2B illustrates an embodiment of a recording media including an adaptive guard band having a guard band cylinder spaced from the logical block zero cylinder.

Although allocation of the guard band zone 144 at the outer diameter or cylinder 112 of the disc for ramp load/unload devices, reduces the risk of data loss in the load/unload area, allocation of the guard band zone 144 limits a data storage capacity of the device. As shown in FIG. 1, the present application implements an adaptive guard band algorithm 153 to configure the firmware 138 of the device to provide an adaptive guard band zone 154 to increase data storage capacity as illustrated in FIG. 2B. In the embodiment shown in FIG. 2B, the adaptive guard band zone 154 has an adaptive pad width 155 smaller than the pad width 145 of the guard band zone 144 shown in FIG. 2A. Track zero 150 is defined at a cylinder spaced from the contact cylinder 146 the reduced pad width 155 to provide an extended data zone $z_0$ 156.

In the embodiment shown, the logical block zero cylinder 152 is spaced from track zero 150 to limit storage of sensitive data in the extended data zone $z_0$ 156. As schematically shown, the logical block zero cylinder 152 is spaced the pad width 145 from contact cylinder 146 and track zero 150 is spaced the reduced pad width 155 from the contact cylinder 146. The logical block zero cylinder 152 is spaced from track zero 150 so that higher LBAs less frequency accessed are stored in the extended data zone 156. Critical and operating system data has lower LBAs and is physically stored at outer diameter zones e.g. $z_1$ of the disc beginning at the logical block zero cylinder 152. Use of the extended data zone to store higher LBA data avoids storage of operating system and frequency accessed data in a zone more susceptible to damage. In the embodiment shown in FIG. 2B, the LBA for inner diameter zone $z_n$ are mapped to the extended data zone $z_0$ 156 for physical storage. Although not shown, the extended data zone $z_0$ 156 can be extended close to the head 102 so that a portion of the head is over the extended data zone 156 at the contact cylinder 146 of the ramp 140 to maximize extended data storage.

Figure 3:
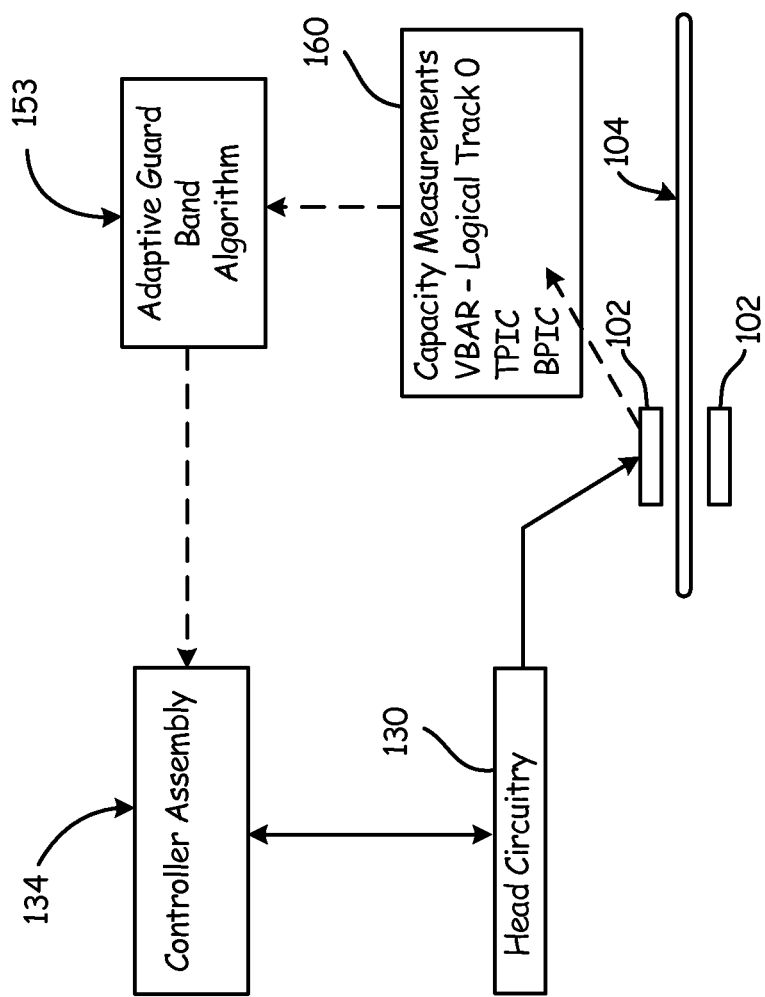
FIG. 3 illustrates an embodiment of an adaptive guard band algorithm implemented through a controller assembly of a data storage device to format a recording media with an adaptive guard band.

As shown schematically in FIG. 3 the adaptive guard band algorithm 153 formats the adaptive guard band 154 and extended data zone 156 utilizing input capacity measurements 160 such as tracks per inch capacity TPIC and margin, bits per inch capacity BPIC and the cylinder of logical block zero 152. The algorithm 153 uses TPIC and margin, BPIC and logical block zero cylinder 152 to determine the capacity of the device. If the device capacity is higher, then no extended data zone $z_0$ 156 is formatted and if the device capacity is lower, the adaptive guard band 154 and extended data zone 156 is implemented through the firmware 138 of the controller assembly 134 to format track zero 150 outward from the logical block zero cylinder 152. As described, the adaptive guard band algorithm 153 is implemented through format instructions stored in memory of one or more hardware components of formatting equipment to format the discs during the manufacturing process.

Figure 4A:
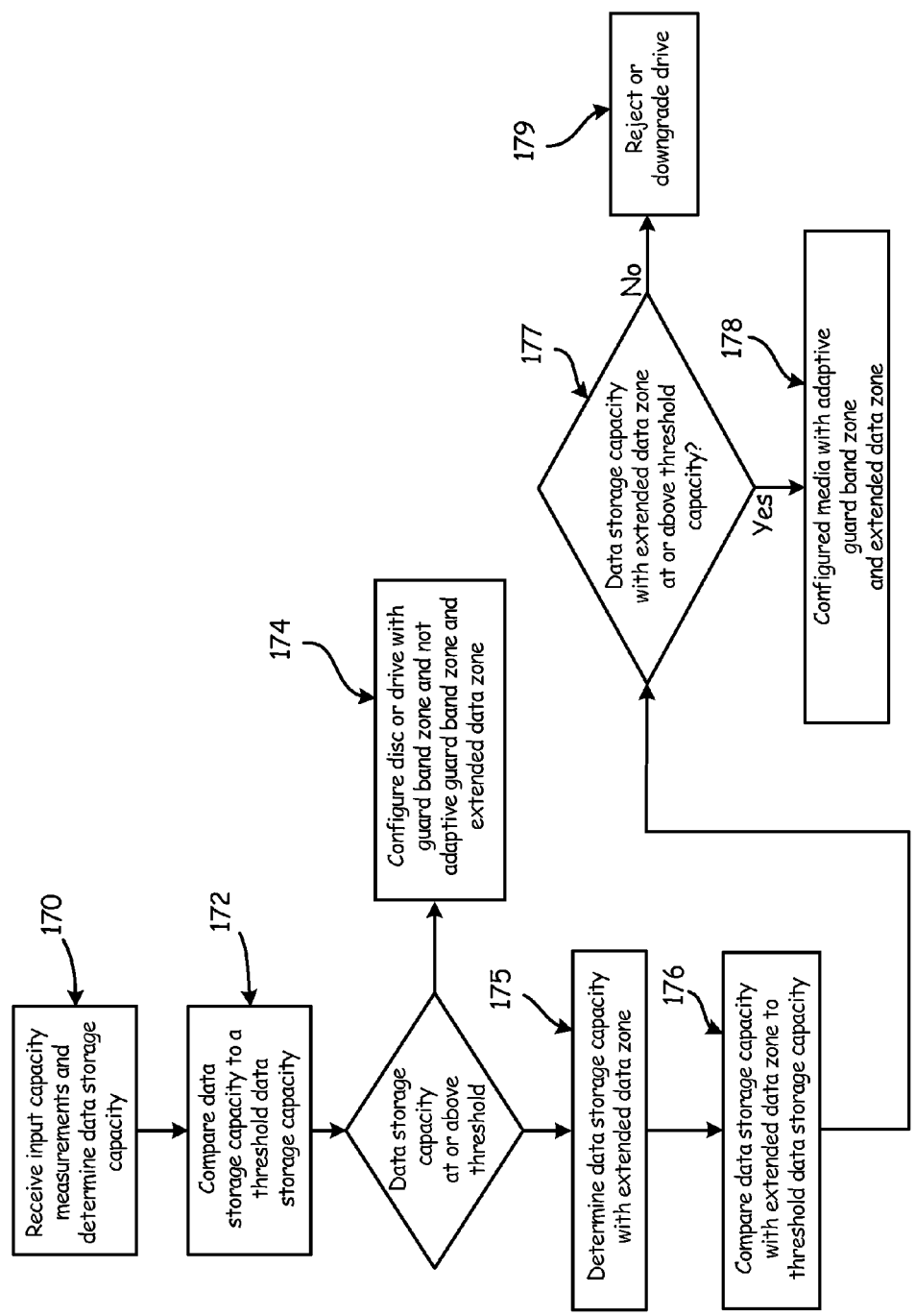
FIG. 4A is a flow chart illustrating an embodiment for implementing an adaptive guard band scheme.

FIG. 4A illustrates process steps for formatting the data storage device utilizing an embodiment of the adaptive guard band algorithm 153 based upon the capacity of the device. As shown, in step 170, input capacity measurements are received and the data storage capacity of the device is determined utilizing the input measurements 160. As previously discussed, the input capacity measurements include BPIC and TPIC to provide the data storage capacity for zones $z_1$-$z_n$ on the disc. In step 172, the capacity of the disc for zones $z_1$-$z_n$ is compared to a threshold data storage capacity. If the capacity of the disc or device is at or above the threshold capacity then the algorithm 153 does not format an adaptive guard band zone 154 and extended data zone 156 for the device as illustrated in step 174.

If the capacity does not meet the data storage capacity threshold, then the capacity of the disc or device having an adaptive guard band zone 154 and extended data zone 156 is determined as illustrated in step 175. In step 176, the data storage capacity with the extended data zone 156 is compared to the threshold capacity to determine if the data storage capacity with the extended data zone is at or above the threshold capacity at step 177. If the capacity of the device with the extended data zone 156 meets the threshold capacity, then the disc or device is formatted with the extended data zone 156 as illustrated in step 178. If the capacity of the disc or device with the extended data zone 156 does not meet the threshold capacity then the device is rejected or is downgraded as illustrated in step 179. As described, the extended data zone 156 and adaptive guard band 154 improves manufacturing yield for devices having the threshold data storage capacity.

Figure 4B:
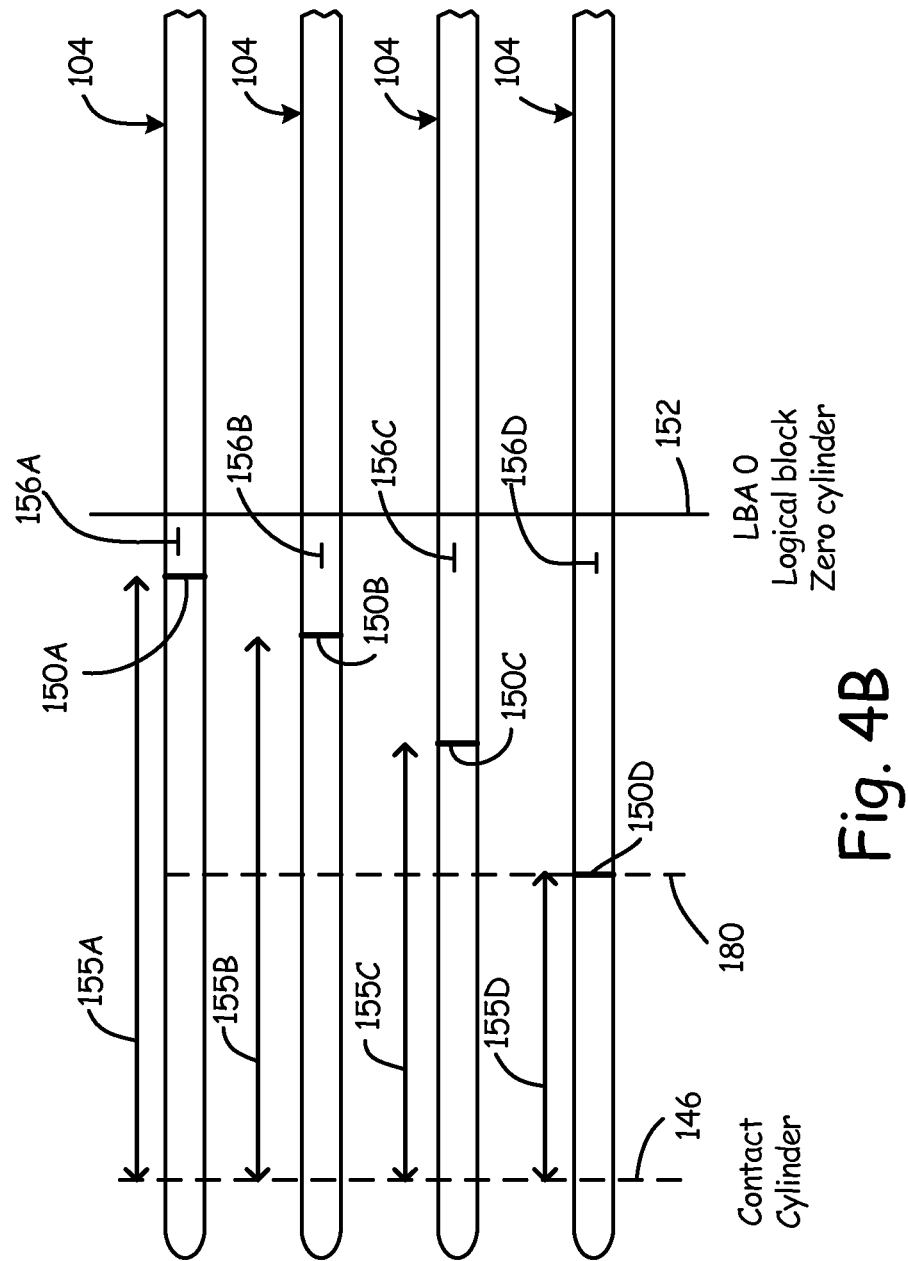
FIG. 4B schematically illustrates a variable size or width for an extended data zone to provide threshold capacity.

As schematically shown in FIG. 4B, the size of the extended data zone 156 is adjustable or variable depending upon the extended data storage capacity required to meet the threshold capacity for the device. FIG. 4B schematically illustrates four different extended data zones 156A, 156B, 156C and 156D having different sizes or widths. The size of the extended data zones 156A, 156B, 156C, 156D is variable between the maximum size of the extended data zone at cylinder 180 and logical block zero cylinder 152. The smallest allowable pad width 155D for the device is measured from the contact cylinder 146 to cylinder 180. In the illustrated embodiment, extended data zones 156A, 156B, and 156C form mini-zones smaller than adjacent zones and the maximum sized extended data zone 156D at cylinder 180. Track zero 150A, 150B, 150C or 150D is formatted at cylinders spaced from logical block zero cylinder 152 the zone width for each of the extended data zone 156A-156D. Data is addressed beginning at logical block zero cylinder 152 outwardly to track zero 150A, 150B, 150C or 150D.

The mini-zones are sized to provide the additional data storage capacity to meet the required threshold capacity. Extended data zone 156A provides the least additional data storage capacity but the largest pad width 155A. Extended data zone 156D provides the maximum additional data storage capacity but the smallest pad width 155D.

Figure 4C:
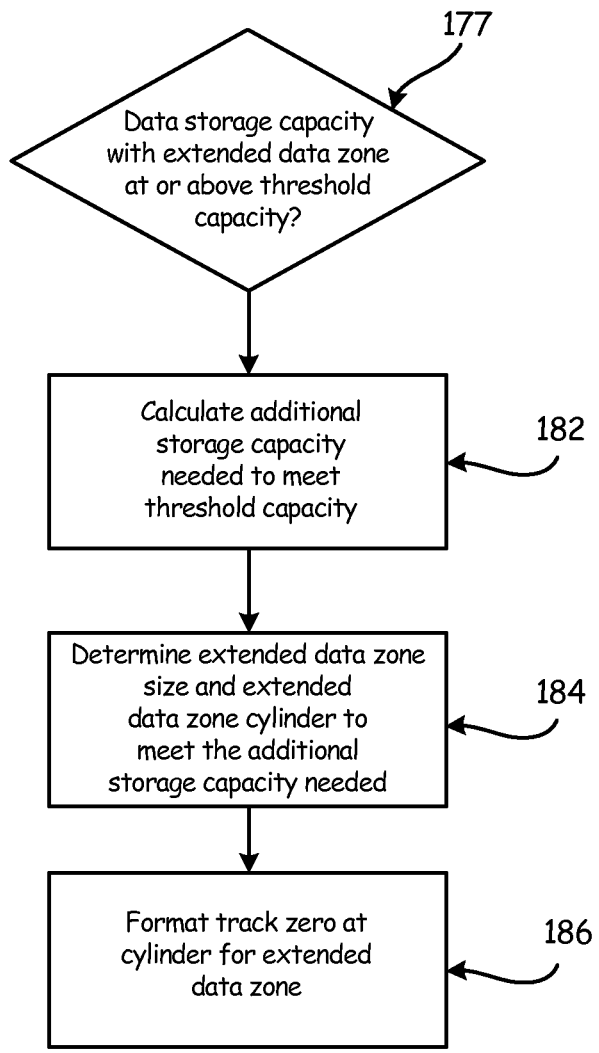
FIG. 4C is a flow chart illustrating process steps for implementing a variable size or width extended data zone.

FIG. 4C illustrates process steps for formatting the size of the extended data zone 155. In particular as shown in FIG. 4C, as previously described at step 177, the data storage capacity with the added extended data zone 156 capacity is compared to the threshold capacity to determine whether to configured the media with the extended data zone or reject or downgrade the drive. In the illustrated embodiment, the maximum extended data storage capacity of zone 156D is used to determine if the data storage capacity of the drive meets the threshold capacity. If the maximum extended data zone capacity of zone 156D provides the additional capacity to meet or exceed the threshold capacity then, the additional storage capacity required to meet the threshold capacity is calculated in step 182. The calculation uses the difference between the threshold capacity and the measured storage capacity of zones $z_1$-$z_n$ to determine the additional capacity required.

In step 184, the additional capacity calculated in step 182 is used to determine a variable width or size of the extended data zone to format track zero 150 in step 186 at the cylinder corresponding to the determined width of the extended data zone 156. In an illustrated embodiment, the variable width or size of the extended data zone is determined using a margin scheme to reduce the number of tracks based upon added capacity or BPI of the extended data zone 156 at the outer diameter relative to the capacity of the inner zone remapped to the extended data zone 156. In one embodiment, the margin scheme reduces the number of tracks or size by the equivalent of 2% of the BPI. The scheme is not limited to 2% and other percent of the BPI can be used. The reduction of the number of tracks or size of the extended data zone $z_0$ 156 increases the pad width 155 to increase reliability of the data in the extended data zone $z_0$ 156.

In the embodiment illustrated in FIG. 5, firmware 138 for the extended data zone $z_0$ 156 includes an extended data zone background media scan component 188. The component 188 is configured to implement an extended data zone background media scan to intermittently check the media for defects to limit data loss proximate to the load/unload area of the disc prior to writing data to the extended data zone 156. In an illustrated embodiment, the extended data zone $z_0$ 156 background media scan is executed after a ramp load/unload procedure upon spin up of the disc 104 to check for damage. If the scan finds defects, then the extended data zone 156 or portion of the extended data zone 156 is not used for data storage. The extended data zone 156 is also scanned following a performance idle, or other period where the heads 102 are located over the extended data zone 156 prior to executing a write command. Data written to the extended data zone 156 is also write verified to enhance integrity of the data and limit data loss.

In an illustrated embodiment the firmware 138 also includes a remapping scheme 189 to provide a smooth transition for remapping data from an inner zone $z_n$ to the extended data zone $z_0$ 156. As previously discussed, the recording frequency for the inner zones $z_n$ is lower than the recording frequency for outer zones $z_1$ or extended data zone $z_0$ 156 as a result of the disc geometry or different tangential velocities at the outer diameter 112 relative to the inner diameter 113. To compensate for the different recording frequencies, the firmware 138 inserts time delays or pads into the inner zone LBA sequence to match the recording frequency of the remapped data to the recording frequency of the extended data zone $z_0$ 156 to provide a smooth transition for physical data storage in the extended data zone $z_0$ 156.

FIGS. 6A-6D schematically illustrate adaptive guard band schemes for multiple heads 102—heads A and head B of a data storage device. In the illustrated embodiments, the multiple heads head A and head B read data on upper and lower surfaces 190, 192 of disc 104. For read and write operations, heads A and B load and unload from ramps A and B. As shown, tolerance variations between heads A and B and ramps A and B provide different contact cylinders 146A-B for heads A and B. As schematically shown, head A contacts ramp A at contact cylinder 146A and head B contacts ramp B at contact cylinder 146B. The contact cylinders 146A-146B are used to format different track zeros for heads A and B for extended data storage.

Figure 6A:
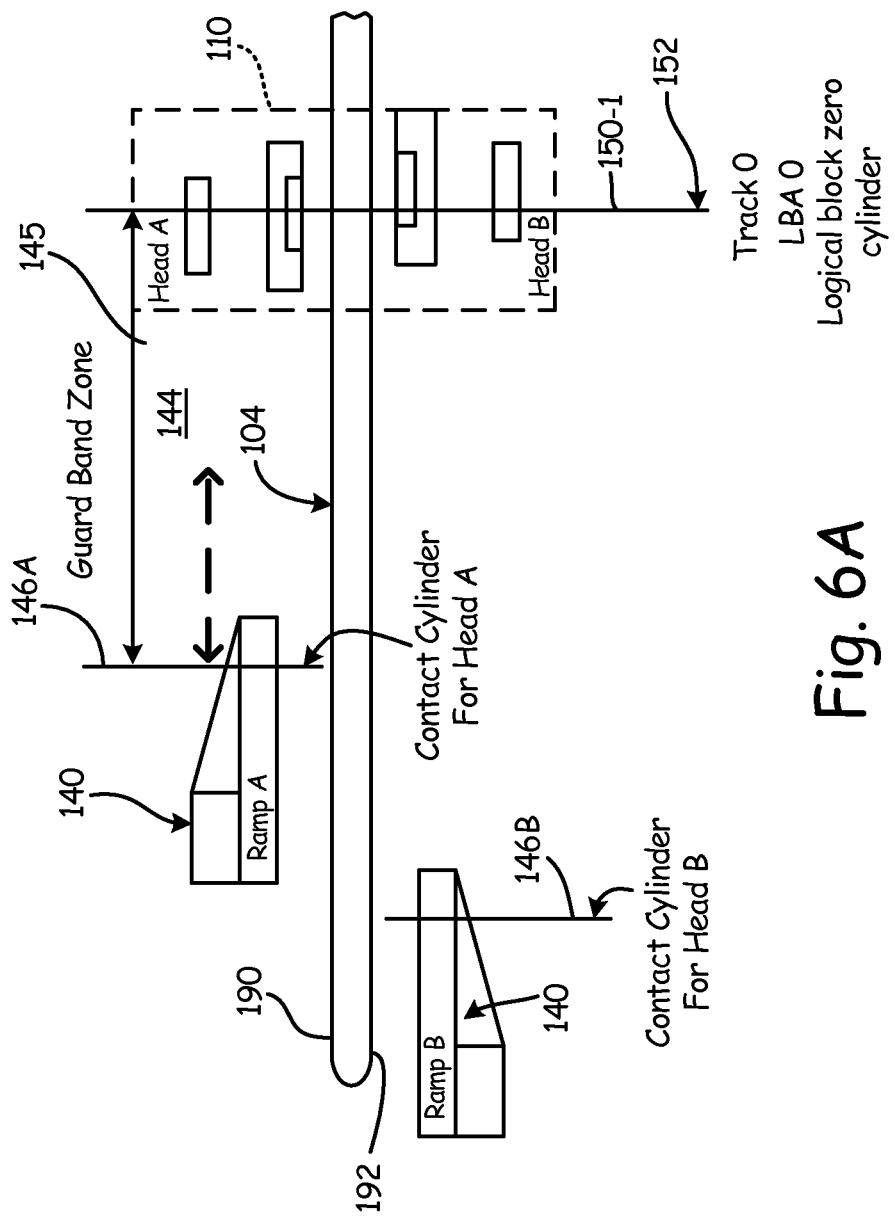
FIG. 6A illustrates a guard band for head A of a data storage device including head A and head B.
Figure 6B:
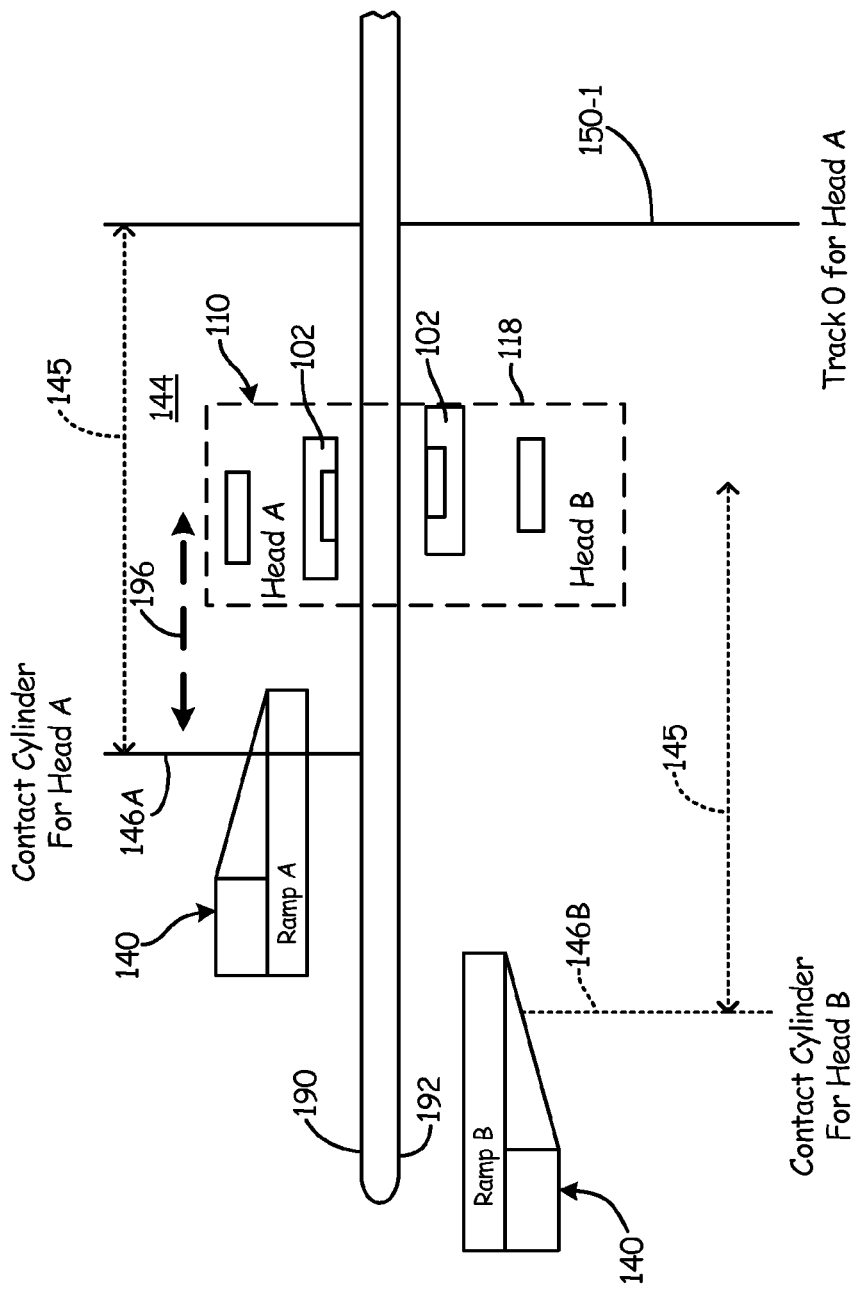
FIGS. 6B-6C illustrate an embodiment of a guard band for head A and format for an adaptive guard band for head B to provide extended data storage as illustrated in FIG. 6C
Figure 6C:
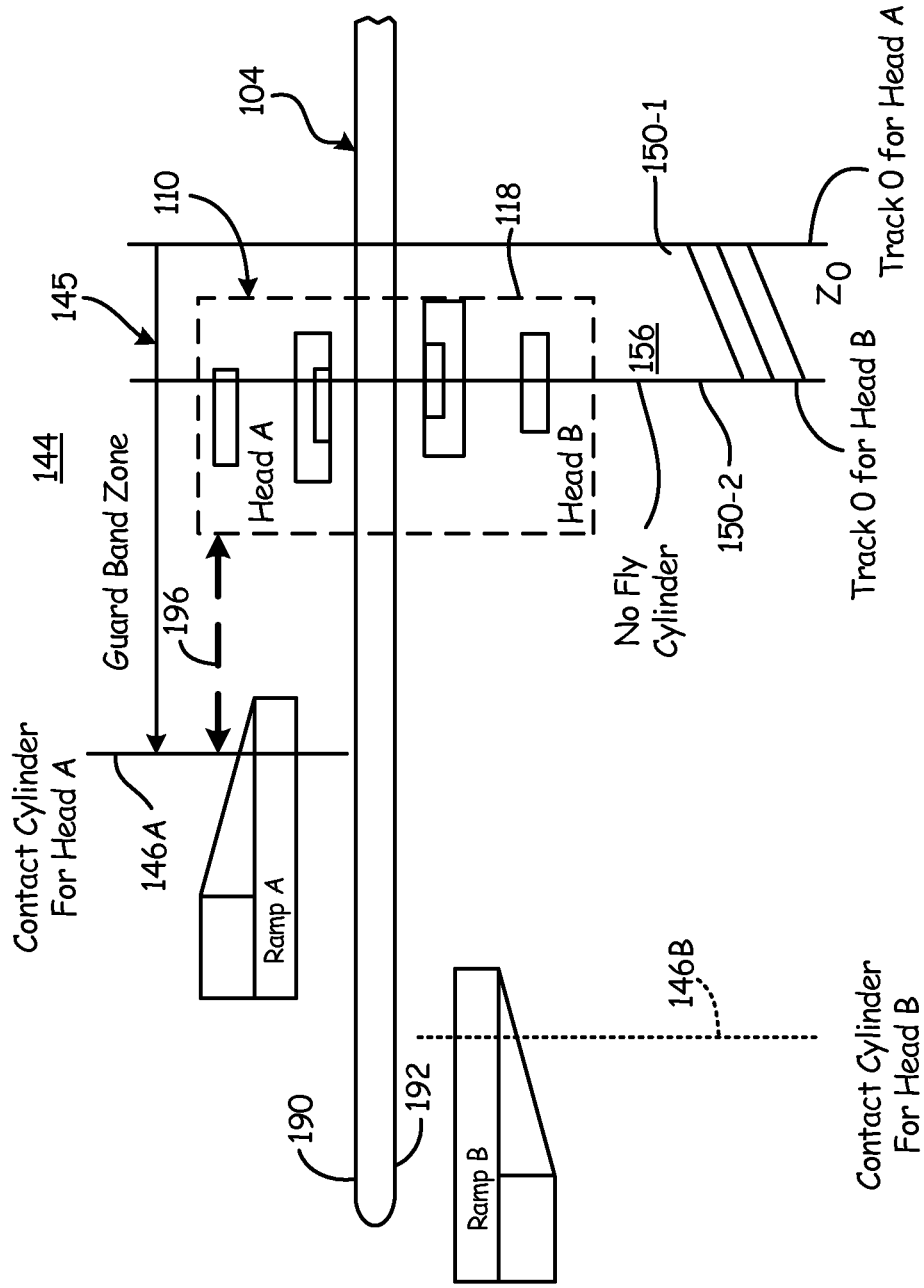

FIGS. 6A-6C progressively illustrate a format scheme for heads A and B. As shown in FIG. 6A, track zero 150-1 for head A is measured the pad width 145 from the contact cylinder 146A for head A and defines the guard band zone 144 and guard band for head A. In the embodiment shown, the logical block zero cylinder 152 is defined at track zero 150-1 for head A. In the illustrated embodiment, the adaptive guard band algorithm 153 determines available tracks for head B and uses the determination to format an adapted guard band 154 and extended data storage zone 156 for head B as progressively illustrated in FIGS. 6B-6C.

As schematically illustrated in FIGS. 6B-6C, the heads A and B are coupled to an actuator block 118 and move in unison through the actuator mechanism 110. The track zero 150-2 for head B is determined using the contact cylinder 146B for head B and a no fly zone 196 and cylinder for head A. The no-fly zone 196 limits the extended data zone $z_0$ 156 for head B to avoid contact between head A and the ramp 140 while accessing data in the extended data zone 156 using head B. As illustrated in FIG. 6B, the pad width 145 from the contact cylinder 146B for head B is within the no fly zone 196 for head A. Thus, as shown in FIG. 6C, track zero 150-2 for head B is formatted at the no fly cylinder for head A which provides the guard band cylinder for head B. In particular, since designation of track zero 150-2 for head B at pad width 145 is within the no-fly zone 196 for head A and would increase the risk of damage to head A during read/write operations for head B, track zero 150-2 for head B is formatted at a no fly cylinder for head A to provide the extended data zone $z_0$ 156 for head B which does not interfere with head A.

Figure 6D:
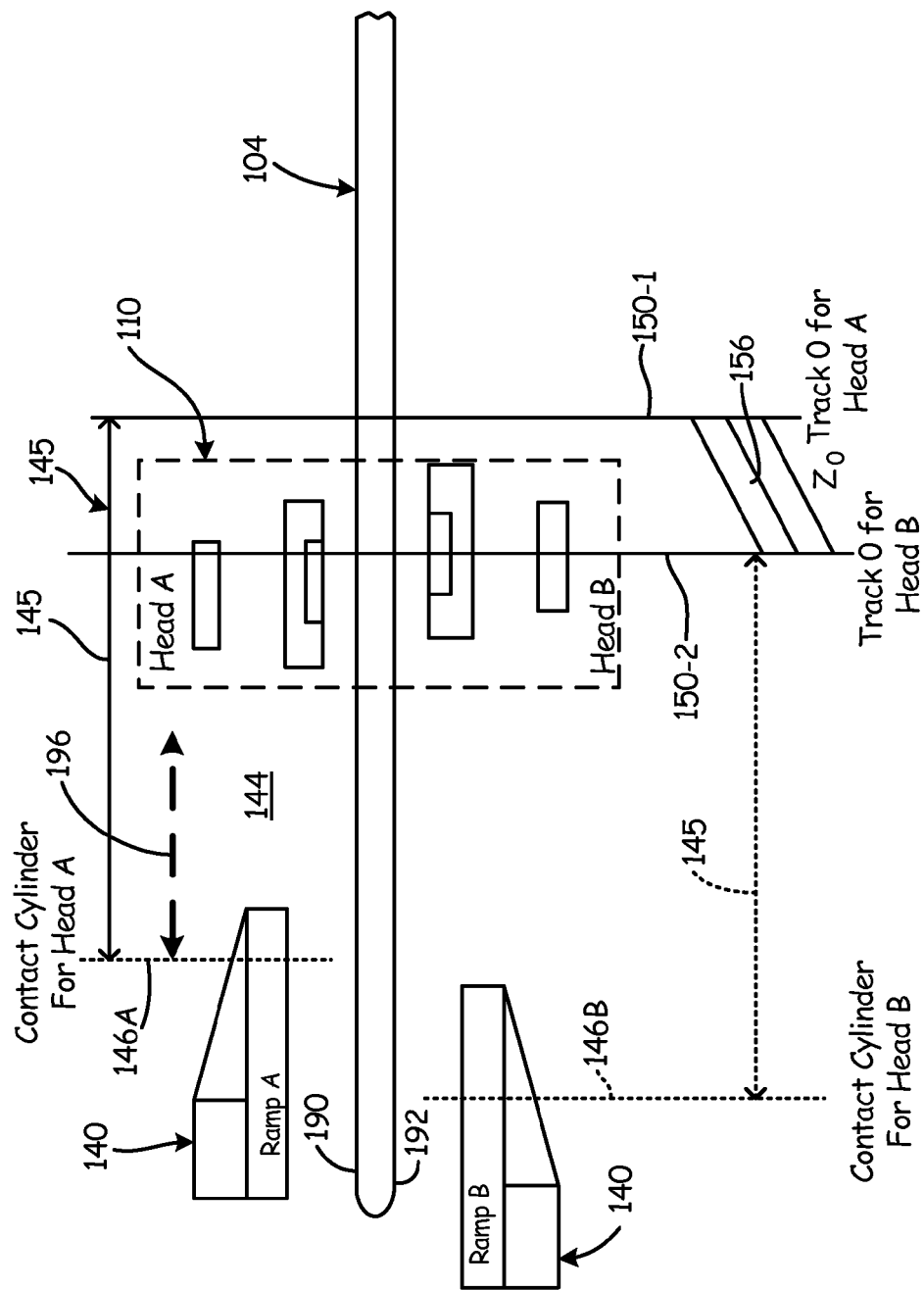
FIG. 6D illustrates another embodiment of a guard band for head A and an adaptive guard band for head B to provide extended data storage.

In an alternate embodiment illustrated in FIG. 6D, the no fly zone 196 for head A does not interfere placement of the track zero 150-2 for head B at the pad width 145 from the contact cylinder 146B for head B. Thus, in the embodiment shown in FIG. 6D, the adaptive guard band cylinder and track zero 150-2 are located at the cylinder spaced the pad width 145 from the contact cylinder 146B for head B to form the extended data zone $z_0$ 156 for head B. As previously discussed, in an illustrated embodiment, the extended data zone 156 is used to store higher LBAs from the inner zones to reduce the risk of data loss due to placement of the extended data zone $z_0$ 156 proximate to the load/unload area of the heads.

Figure 7:
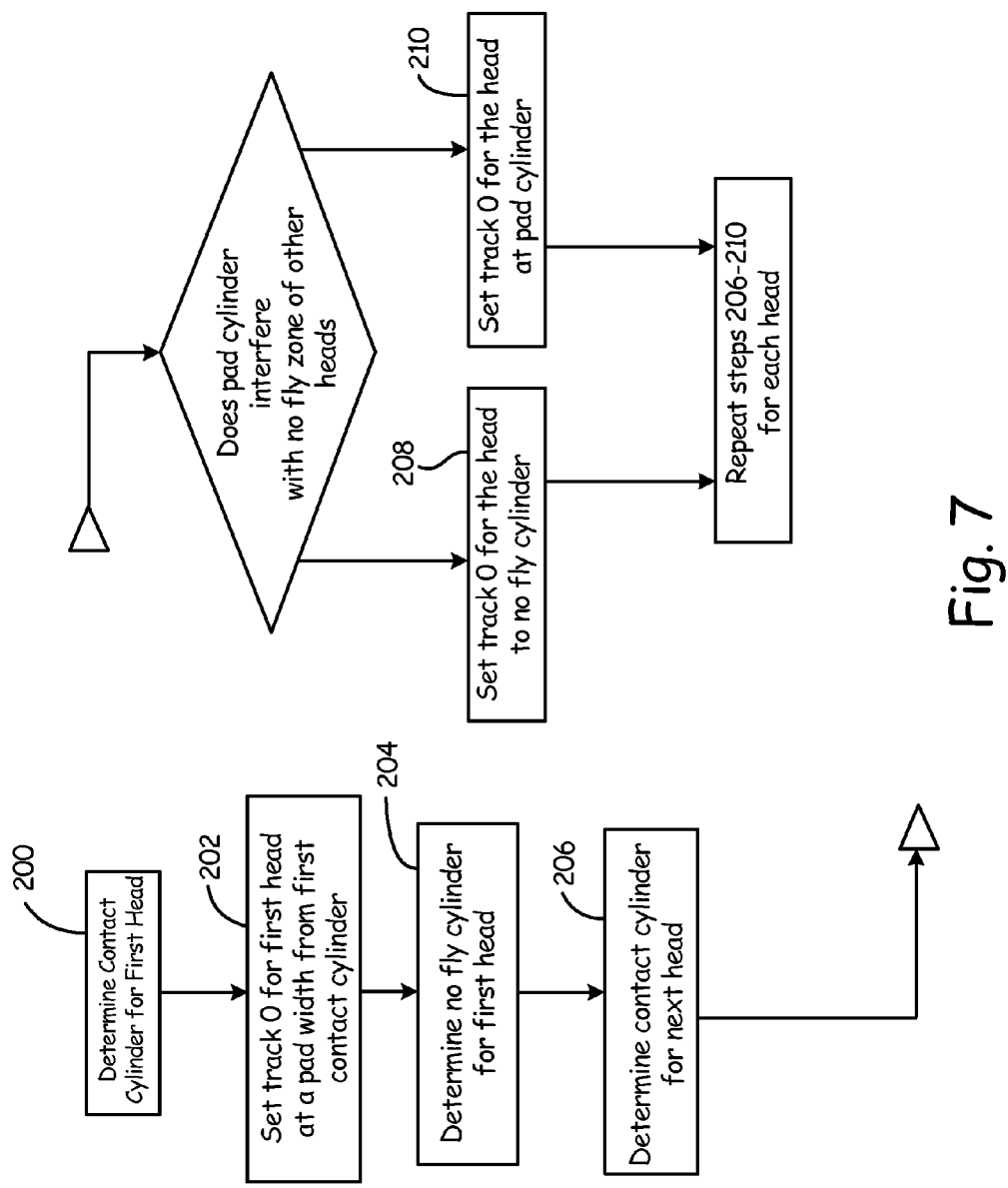
FIG. 7 is a flow chart illustrating an embodiment for implementing an adaptive guard scheme for multiple heads of a data storage device.

FIG. 7 illustrates a flow chart for configuring extended data zones 156 for multiple heads of a data storage device. As shown in step 200, contact cylinder 146 for the first head is determined. The contact cylinder 146 is the cylinder where the first head contact is detected. As illustrated in step 202, track zero 150-1 for the first head is set at a pad width 145 from the first contact cylinder. Based upon the contact cylinder, a not fly cylinder is determined in step 204 to provide a no-fly zone 196 to limit contact with the ramp during read/write operations utilizing the other heads. In step 206, the contact cylinder 146 for the next head is determined. As shown in step 208, if a cylinder at a pad width 145 from the contact cylinder 146 does not interfere with the no fly zone 196 of the first head, the pad cylinder is used to format track zero 150 and the extended data zone $z_0$ 156 for the next head. If the pad cylinder does interfere with the no fly zone 196, then the no fly cylinder is used to format track zero 150 and the extended data zone 156 in step 210. Steps 206-210 are repeated for each head of the head stack to configure track zero 150 and the extended data storage zone 156 or adaptive guard band for the multiple heads of the data storage device.

Figure 8A:
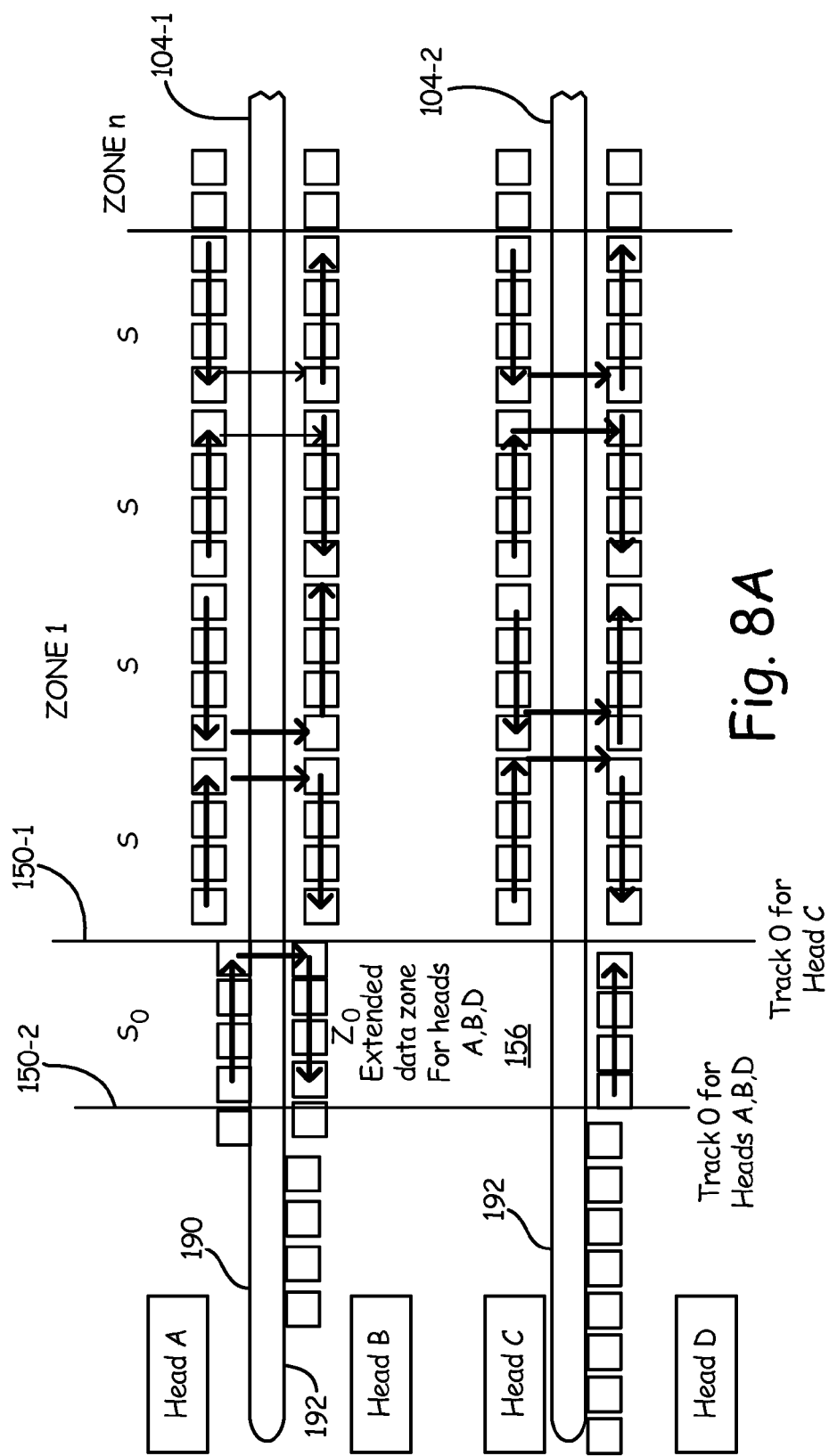
FIGS. 8A-8B illustrate embodiments for formatting a different track zeros for select heads of a multiple head data storage device.
Figure 8B:
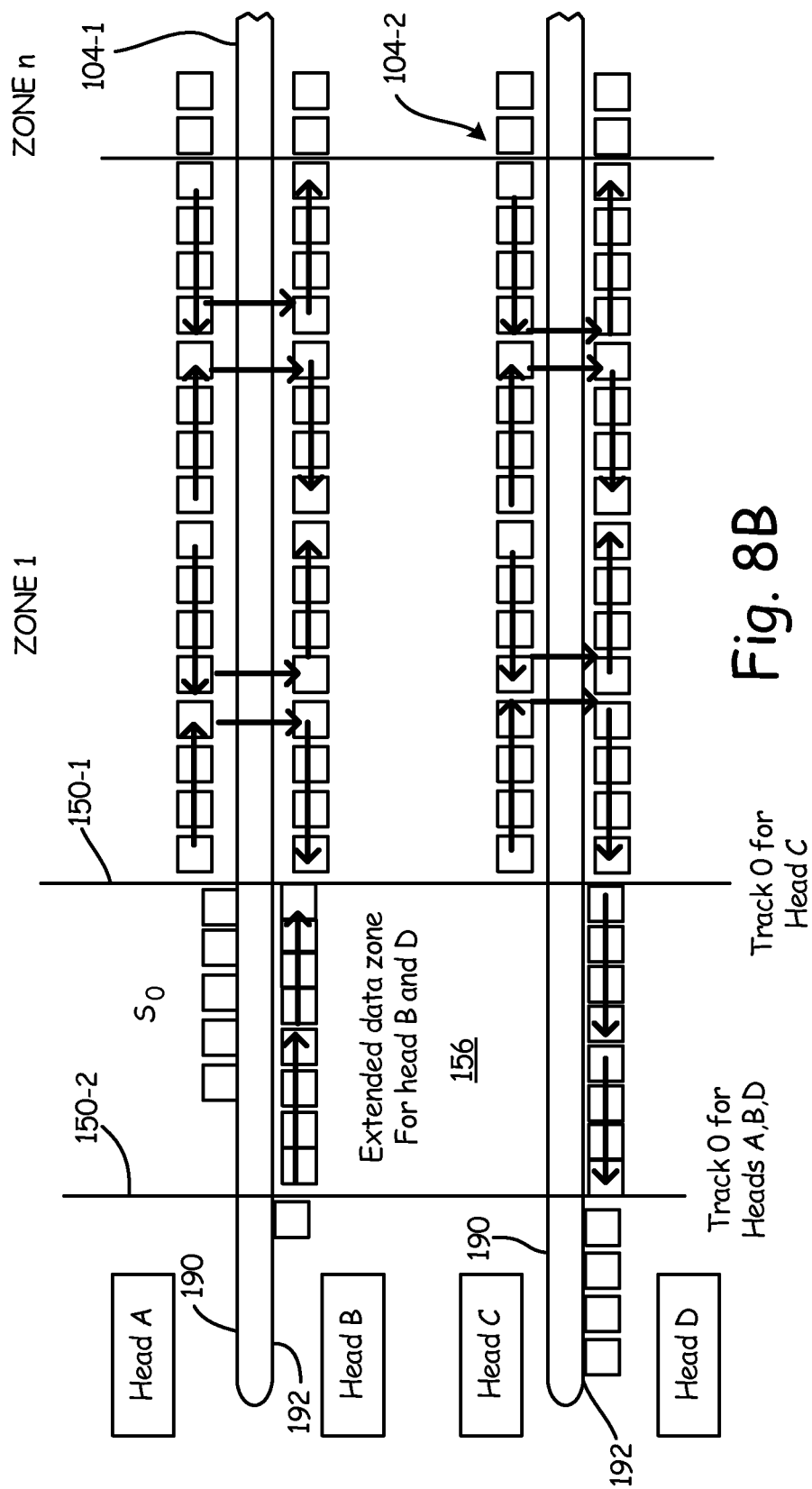

FIGS. 8A-8B illustrate embodiments of a device including multiple heads A-D (schematically shown) configured to read and write data to upper and lower recording surfaces 190, 192 of discs 104-1, 104-2. Heads A and B read data from upper and lower surfaces 190, 192 of disc 104-1 and heads C and D read data from upper and lower surfaces 190, 192 of disc 104-2. The vertically aligned tracks on each of the discs 104-1, 104-2 forms the cylinders of the disc stack. In the illustrated embodiment, data is stored to a plurality of vertically aligned tracks or cylinders in a serpents storage pattern as shown. The serpent pattern enhances sequential data rates by switching between adjacent tracks and heads within a particular zone to limit access time and movement of the actuator block 118 (not shown). Each zone $z_1$-$z_n$ includes multiple serpent paths to facilitate efficient data storage and retrieval. The firmware of the device assigns LBAs to adjacent tracks for different heads in a serpent path to provide the serpent storage pattern as illustrated in FIGS. 8A-8B. Although FIGS. 8A-8B illustrate one particular serpent path pattern, application is not limited to the particular serpent pattern shown.

FIGS. 8A-8B illustrate different embodiments for configuring track zero and extended data zones 156 for heads A-D. Tracks 114 are schematically illustrated as blocks in FIGS. 8A-8B for illustration purposes. As shown, track zero 150-1 is defined based upon the contact cylinder for head C. In the embodiments shown, heads A, B and D have tracks available (schematically illustrated as blocks) for extended data storage outward from 1 track zero 150-1 for—head C. The available tracks are determined based upon the contact cylinder for heads A, B and D and required pad width 145 from the contact cylinder 146 for heads A, B and D or no fly cylinder or zone 196 for head C as previously described. In the embodiment shown in FIG. 8A, the device is formatted to provide track zero 150-2 for heads A, B and D spaced from track zero 150-1 for head C and an extended serpent path So including available tracks for heads A, B and D to define an adaptive guard band for heads A, B and D and the extended data storage zone $z_0$ 156 for heads A, B and D.

In another embodiment illustrated in FIG. 8B, the device is formatted to provide extended serpent path $S_0$ utilizing available tracks for heads B and D to define track zero 150-2 for heads B and D and extended data zone 156 $z_0$ for heads B and D to optimize use of the available tracks for heads A-D. In the embodiment illustrated in FIG. 8B, use of heads B and D provides optimum uses of the available tracks for a device having one extended track zero 150-2 for heads A-D. FIG. 8B provides optimum use of the available tracks for data storage since as schematically shown, the serpent path(s) or pattern utilizes more of the available tracks for heads A, B, D for extended data storage. The firmware 138 or algorithm for formatting the multiple heads for extended data storage can include instructions or code for tuning the extended data zone $z_0$ 156 for optimum data storage capacity, efficiency and read/write time as illustrated in FIG. 9.

Figure 9:
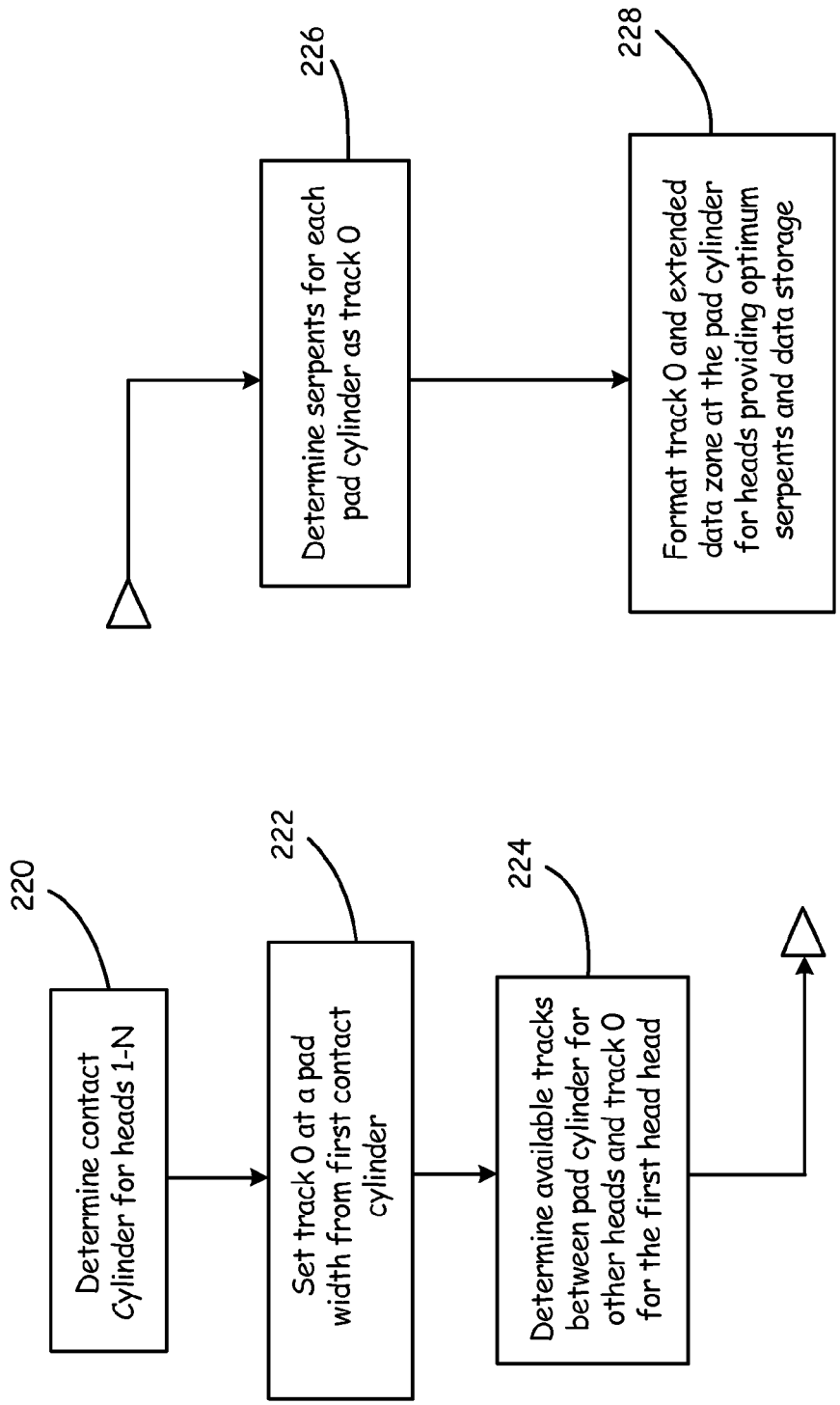
FIG. 9 illustrates a flow chart for formatting different track zeros for different heads of a multiple head data storage device.

FIG. 9 illustrates steps for tuning the extended data storage for the device. As shown in FIG. 9, the contact cylinders for each head are determined in step 220. The contact cylinder for the first head to contact the ramp is used to set track zero 150-1 in step 222. In step 224, the cylinders spaced a pad width from the contact cylinder for each heads (and spaced from no fly cylinder as previously described) are used to determine available tracks between the pad cylinder and track zero 150-1. The algorithm 153 uses the pad cylinders for each of the heads as the track zero to calculate different serpent paths or patterns for each possible track zero in step 226. Thus, as illustrated with respect to FIG. 8A, pad cylinder for head A is used as the track zero 150-2 and extended data storage for heads A, B and D at extended track zero 150-2 is determined. Next the algorithm repeats the calculation for head B where the pad cylinder for head B is used as the extended track zero 150-2 as illustrated in FIG. 8B and the available serpent paths are calculated. In step 228, the track zero 150-2 providing the optimum extended data storage capacity is selected as track zero 150-2 to format the discs or data storage media.

Figure 10A:
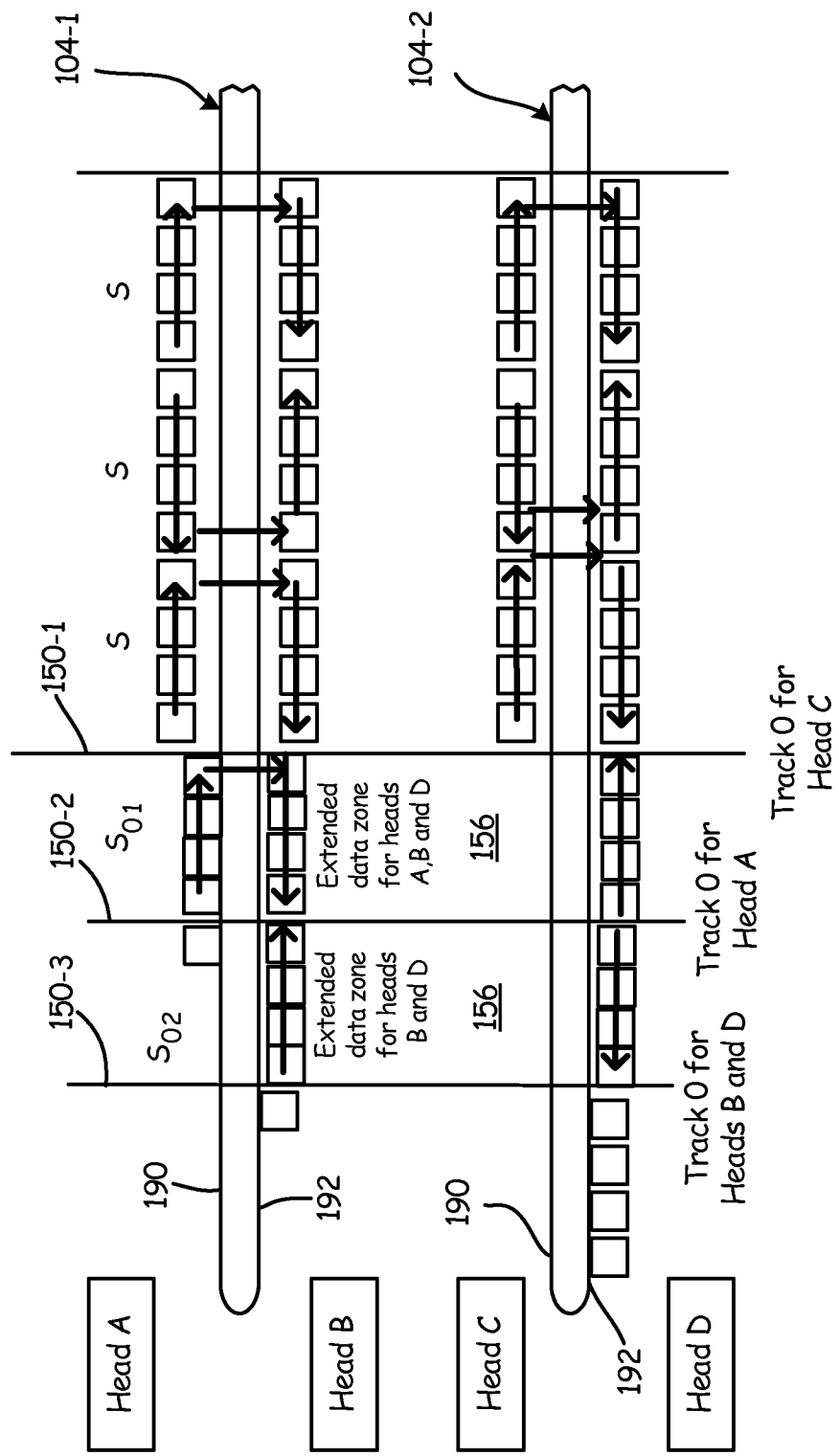
FIGS. 10A-10B illustrate embodiments for formatting multiple track zeros for different heads of a multiple head data storage device.
Figure 10B:
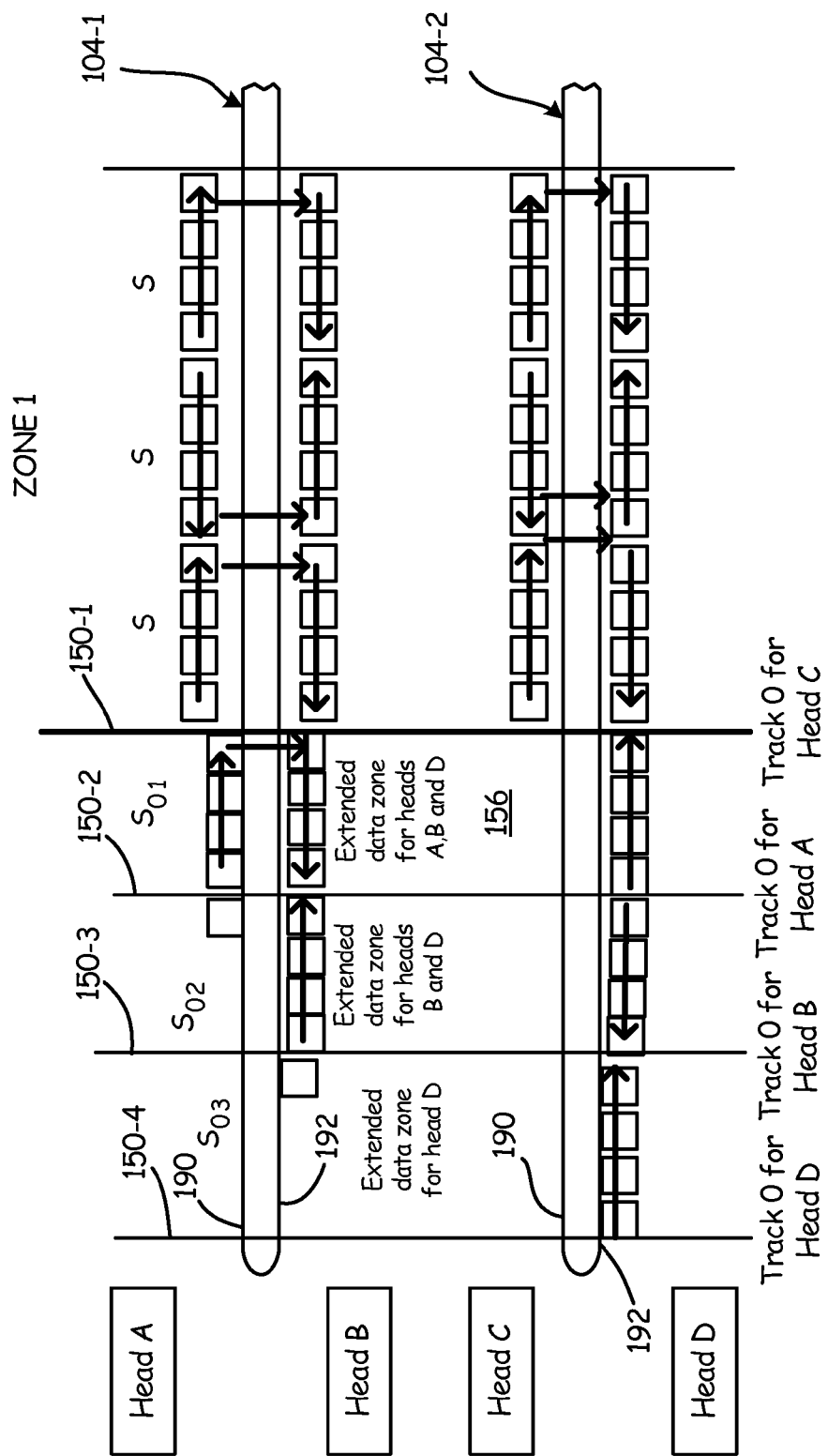

FIGS. 10A-10B illustrate embodiments of a multiple head device having a plurality of track zero 150-1, 150-2, 150-3 for heads A-D. In the embodiment illustrated in FIG. 10A, the device includes a first track zero 150-1 for head C, a second track zero 150-2 for head A and a third track zero 150-3 for heads B and D. The track zero 150-2 is physically located at a cylinder spaced outwardly of track zero 150-1 for head C and the track zero 150-3 is physically located at a cylinder spaced outwardly from the track zero 150-2 for head A. As shown in FIG. 10A, a first extended zone between track zero 150-1 and track zero 150-2 for head C includes a serpent pattern $S_{01}$ (illustrated schematically) including heads A, B and D and a second extended data zone between extended track zero 150-3 and track zero 150-2 includes a serpent pattern $S_{02}$ including heads B and D to optimize data storage for available extended data tracks.

In the embodiment illustrated in FIG. 10B, the plurality of extended track zeros for heads A-D includes track zero 150-1 for head C, track zero 150-2 for head A and track zero 150-3 for head B and track zero 150-4 for head D. As shown, track zero 150-2 is radially spaced from track zero 150-1, track zero 150-3 is radially spaced from track zero 150-2 and track zero 150-4 is radially spaced from track zero 150-3. As shown, a serpent pattern $S_{01}$ for heads A, B and D is formatted for a first extended data zone at track zero 150-2, a second serpent pattern $S_{02}$ for heads B and D is formatted for a second extended data zone at track zero 150-3. Serpent pattern $S_{03}$ for head D is formatted at a third extended data zone at extended track zero 150-4. The multiple extended track zeros optimize use of available tracks for increased data storage.

Embodiments of the present application have application for devices implementing variable bit rate aspect ratios for different heads or media to enhance data storage capacity of the device. It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application while maintaining substantially the same functionality without departing from the scope and spirit of the present invention. In addition, although the embodiments described herein are directed to particular examples it will be appreciated by those skilled in the art that the teachings of the present invention are not limited to the particular examples and other embodiments can be implemented without departing from the scope and spirit of the present invention.

What is claimed is:

1. An assembly comprising:
   a first head configured to read or write data to a first recording media surface;
   a second head configured to read or write data to a second recording media surface; and
   instructions stored in memory and implemented through a controller assembly to store data to a first extended data zone on the first recording media surface beginning at a first track zero at a first cylinder and extending to a first logical block zero cylinder on the first recording media surface, and store data to a second extended data zone on the second recording media surface beginning at a second track zero at a second cylinder different from the first cylinder and extending to a second logical block zero cylinder on the second recording media surface, wherein the first and second extended data zones are within a designated guard band zone, wherein the first logical block zero cylinder corresponds to a first track on the first recording media surface accessed by a host to read or write data, wherein the second logical block zero cylinder corresponds to a first track on the second recording media surface accessed by the host to read or write data.

2. The assembly of claim 1 wherein the first and second recording media surfaces comprise opposing sides of a single recording disc.

3. The assembly of claim 2 wherein the single recording disc comprises a radius, an outer diameter and an inner diameter, and wherein the first cylinder and the second cylinder are positioned between the inner diameter and the outer diameter, and wherein the second cylinder is spaced radially outwardly towards the outer diameter of the single recording disc from the first cylinder.

4. The assembly of claim 2 wherein the first track zero is spaced a first pad width along a radius of the single recording disc from a first contact cylinder where the first head contacts a first load/unload ramp and the second track zero is spaced a second pad width along the radius of the single recording disc from a second contact cylinder where the second head contacts a second load/unload ramp, and wherein the first pad width is a width along the radius within a first guard band zone on the first recording media surface, the first guard band zone being between the first contact cylinder and the first track zero and comprising tracks on which no data storage by the first head is permitted, and wherein the second pad width is a width along the radius within a second guard band zone, the second guard band zone being between the second contact cylinder and the second track zero and comprising tracks on which no data storage by the second head is permitted.

5. The assembly of claim 2 wherein the single recording disc comprises a radius, an inner diameter and an outer diameter, and wherein the assembly further comprises:
   a first contact cylinder where the first head contacts a load/unload ramp, the first contact cylinder being proximate to the outer diameter, wherein the first track zero is positioned radially inwardly from the first contact cylinder;
   the designated guard band zone being divided into a first region having tracks on which no data storage by the first head is permitted and a second region positioned radially inwardly from the first region having tracks on which data storage by the first head is permitted; and
   a no fly cylinder for the first head positioned substantially at a junction between the first region and the second region,
   wherein the first track zero is defined at the no fly cylinder for the first head.

6. The assembly of claim 1 and comprising a third head configured to read or write data to a third recording media surface and the instructions are configured to store data to the third recording media surface beginning at a third logical block zero cylinder.

7. The assembly of claim 6 wherein the instructions format an extended data zone between a third track zero at a third cylinder and the third logical block zero for the third head on the third recording media surface.

8. The assembly of claim 7 wherein each of the extended data zones includes one or more serpent paths utilizing tracks.

9. The assembly of claim 1 wherein the designated guard band zone comprises cylinders used for a load/unload operation.

10. The assembly of claim 1 and comprising a third head where the third head has a third track zero at a third cylinder spaced from the first and second cylinders.

11. An assembly comprising:
a guard band algorithm including instructions stored on one or more hardware components implemented through a controller assembly to format a first extended data zone beginning at a first track zero at a first cylinder and extending to a first logical block zero cylinder on a first recording media surface, and to format a second extended data zone on a second recording media surface beginning at a second track zero at a second cylinder different from the first cylinder and extending to a second logical block zero cylinder, wherein the first and second extended data zones are within a designated guard band zone
wherein the first logical block zero cylinder corresponds to a first track on the first recording media surface accessed by a host to read or write data, and
wherein the second logical block zero cylinder corresponds to a first track on the second recording media surface accessed by the host to read or write data.

12. The assembly of claim 11 where the first and second recording media surfaces are upper and lower surfaces of a single data storage disc.

13. A method comprising:
formatting a first head track zero at a first cylinder spaced between a first contact cylinder where a first head contacts a first load/unload ramp and a first logical block zero cylinder on a first recording surface to form a first extended data zone on the first recording surface; and
formatting a second head track zero at a second cylinder spaced from the first cylinder to provide an extended data zone for a second head between the second head track zero at the second cylinder and a second logical block zero cylinder on a second recording surface to form a second extended data zone on the second recording surface, wherein the first logical block zero cylinder corresponds to a first track on a first recording media surface accessed by a host to read or write data, and wherein the second logical block zero cylinder corresponds to a first track on a second recording media surface accessed by the host to read or write data, and wherein the first and second extended data zones are within a designated guard band zone.

14. The method of claim 13, wherein the first and second recording media surfaces are provided on opposing sides of a single recording disc, and wherein the step of formatting the first head track zero at the first cylinder and the second head track zero at the second cylinder for the first and second heads comprises:
determining the first contact cylinder where the first head contacts the first load/unload ramp;
formatting the first head track zero at a first pad width along a radius of the single recording disc from the first contact cylinder;
determining a second contact cylinder where the second head contacts a second load/unload ramp; and
formatting the second head track zero at a second pad width along the radius of the single recording disc from the second contact cylinder,
wherein the first pad width is a width along the radius within a first guard band zone on the first recording media surface, the first guard band zone being between the first contact cylinder and the first track zero and comprising tracks on which no data storage by the first head is permitted, and wherein the second pad width is a width along the radius within a second guard band zone, the second guard band zone being between the second contact cylinder and the second track zero and comprising tracks on which no data storage by the second head is permitted.

15. The method of claim 13 and comprising:
providing the first and second recording media surfaces on opposing sides of a single recording disc having a radius, an outer diameter and an inner diameter;
determining the first contact cylinder where the first head contacts the first load/unload ramp proximate to the outer diameter, wherein the first track zero is positioned radially inwardly from the first contact cylinder;
determining a first guard band zone between the first contact cylinder and the first track zero, the first guard band zone being divided into a first region having tracks on which no data storage by the first head is permitted and a second region positioned radially inwardly from the first region having tracks on which data storage by the first head is permitted; and
defining a no fly cylinder for the first head substantially at a junction between the first region and the second region; and
formatting the second head track zero for the second head at the no fly cylinder for the first head.

16. The method of claim 13 and comprising:
providing the first and second recording media surfaces on opposing sides of a single recording disc having a radius, an outer diameter and an inner diameter; and
formatting the second head track zero for the second head at a second pad width from a second contact cylinder where the second head contacts a second load/unload ramp, wherein the second pad width is a width along the radius within a second guard band zone, the second guard band zone being between the second contact cylinder and the second head track zero and comprising tracks on which no data storage by the second head is permitted.

17. The method of claim 13 and comprising:
formatting a third head track zero for a third head at a third cylinder spaced from the first and second cylinders.

18. The method of claim 13 and comprising:
formatting a third head track zero for a third head at one of the first and second cylinders.

19. The method of claim 13 and comprising:
determining available tracks for the second head and a third head between second and third contact cylinders for the second and third heads and the first head track zero, wherein the second contact cylinder for the second head is a cylinder located where the second head contacts a second load/unload ramp, and wherein the third contact cylinder for the third head is a cylinder located where the third head contacts a third load/unload ramp; and formatting the second head track zero and a third head track zero at the second cylinder providing a largest number of extended serpent tracks for both the second and third heads to optimize extended data storage.

\* \* \* \* \*